US012763037B2

(12) United States Patent
Yoon

(10) Patent No.: US 12,763,037 B2
(45) Date of Patent: Oct. 13, 2026

(54) METHOD AND APPARATUS FOR DISPLAYING IMAGE USING ADVANCED WHITE BALANCE CALIBRATION

(71) Applicant: Hyundai Mobis Co., Ltd., Seoul (KR)

(72) Inventor: Kyung Ho Yoon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 19/303,702

(22) Filed: Aug. 19, 2025

(65) Prior Publication Data

US 2026/0073883 A1 Mar. 12, 2026

(30) Foreign Application Priority Data

Sep. 6, 2024 (KR) ........................ 10-2024-0121481

(51) Int. Cl.
*G09G 3/36* (2006.01)

(52) U.S. Cl.
CPC ....... *G09G 3/36* (2013.01); *G09G 2320/0242* (2013.01); *G09G 2320/0666* (2013.01); *G09G 2320/0693* (2013.01); *G09G 2360/16* (2013.01)

(58) Field of Classification Search
CPC ... G09G 3/36–3696; G09G 2320/0209; G09G 2320/0214; G09G 2320/0223; G09G 2320/0233; G09G 2320/0242; G09G 2320/0271; G09G 2320/0276; G09G 2320/029; G09G 2320/0295; G09G 2320/0626; G09G 2320/066; G09G 2320/0666; G09G 2320/0693; G09G 2360/14; G09G 2360/145; G09G 2360/147; G09G 2360/16
See application file for complete search history.

(56) References Cited

U.S. PATENT DOCUMENTS

| | | | | |
|---|---|---|---|---|
| 9,754,543 | B2 * | 9/2017 | Ma | G09G 3/36 |
| 2008/0252589 | A1 * | 10/2008 | Chung | G09G 3/3607 345/102 |
| 2010/0134532 | A1 * | 6/2010 | Choi | G09G 3/3413 345/102 |
| 2010/0253711 | A1 * | 10/2010 | Muroi | G02F 1/133603 345/102 |
| 2017/0196066 | A1 * | 7/2017 | Dong | G09G 3/3413 |

* cited by examiner

*Primary Examiner* — Nathan Danielsen
(74) *Attorney, Agent, or Firm* — NSIP Law

(57) ABSTRACT

A method and apparatus for displaying an image using advanced white balance calibration, an image display method includes receiving target color coordinates and target luminance, receiving actual color coordinates and actual luminance measured from an LCD module, performing tristimulus conversion, the actual color coordinates, and the actual luminance, outputting R/G/B gain values, calculating an estimated luminance value of the LCD module, comparing the estimated luminance value with the target luminance value to estimate a BLU LED current required to output the target luminance value, predicting an amount of color coordinate variation caused by the estimated BLU LED current fluctuation, compensating for the target color coordinates and calculating final R/G/B gain values and applying the final R/G/B gain values to the LCD module.

8 Claims, 4 Drawing Sheets

METHOD AND APPARATUS FOR DISPLAYING IMAGE USING ADVANCED WHITE BALANCE CALIBRATION

CROSS-REFERENCE TO RELATED APPLICATION

This application claims the benefit of and priority to Korean Patent Application No. 10-2024-0121481, filed on Sep. 6, 2024, the entire disclosure(s) of which is hereby incorporated herein by reference in its entirety.

TECHNICAL FIELD

The present disclosure relates to a method and an apparatus for displaying an image using advanced white balance calibration. More specifically, the present disclosure relates to a method and an apparatus for displaying an image, which shortens a calibration process by simultaneously performing white balance calibration and brightness calibration.

BACKGROUND

The content described below simply provides background information related to the present embodiment and does not constitute the prior art.

LCD modules are installed in both the interior and exterior of vehicles for various purposes. The display of an LCD module has unique optical properties, and the color accuracy and uniformity of the display significantly affect the user experience. The color accuracy and uniformity of the display may be adjusted using white balance calibration.

White balance calibration refers to the process of adjusting the color temperature of a display to accurately reproduce standard white. White balance calibration may minimize color coordinate discrepancies that may occur during the manufacturing process of LCD modules. Also, by accurately representing standard white, white balance calibration may ensure color accuracy and uniformity.

Traditional white balance calibration methods are based on the CIE 1931 chromaticity diagram. Conventional methods primarily rely on adjusting the gains of R and G channels, which may result in significant luminance loss when the gain of the channel contributing the most to luminance is adjusted. Furthermore, if the color coordinates differ between LCD modules, the adjusted gain values may become inconsistent, reducing the accuracy of white balance and ultimately degrading color consistency among products.

To compensate for luminance loss that may occur after white balance calibration, brightness calibration is required. However, during the brightness calibration process, additional drift in color coordinates may occur, necessitating another calibration process. This repeated calibration process requires additional time and cost.

SUMMARY

In view of the above, the present disclosure primarily aims to provide a method and an apparatus capable of shortening the overall calibration process by utilizing an advanced white balance calibration process.

The technical objects of the present disclosure are not limited to those described above, and other technical objects not mentioned above may be understood clearly by those skilled in the art from the descriptions given below.

According to an embodiment, an image display method includes: receiving target color coordinates and target luminance, receiving actual color coordinates and actual luminance measured from an LCD module, performing tristimulus conversion using one or more of the target color coordinates, the target luminance, the actual color coordinates, and the actual luminance, outputting R/G/B gain values using a white balance algorithm, calculating an estimated luminance value of the LCD module when the outputted R/G/B gain values are applied to the LCD module, comparing the estimated luminance value with the target luminance value to estimate a BLU LED current required to output the target luminance value, predicting an amount of color coordinate variation caused by the estimated BLU LED current fluctuation, compensating for the target color coordinates using the predicted color coordinate variation and calculating final R/G/B gain values and applying the final R/G/B gain values to the LCD module.

According to another embodiment, an image display apparatus includes: at least one memory configured to store commands and at least one processor. The at least one processor is configured to receive target color coordinates and target luminance, receive actual color coordinates and actual luminance measured from an LCD module, perform tristimulus conversion using one or more of the target color coordinates, the target luminance, the actual color coordinates, and the actual luminance, output R/G/B gain values using a white balance algorithm, calculate an estimated luminance value of the LCD module when the outputted R/G/B gain values are applied to the LCD module, compare the estimated luminance value with the target luminance value to estimate the BLU LED current required to output the target luminance value, predict the amount of color coordinate variation caused by the estimated BLU LED current fluctuation, compensate for the target color coordinates using the predicted color coordinate variation and calculate final R/G/B gain values and applying the final R/G/B gain values to the LCD module.

According to one embodiment of the present disclosure, an advanced white balance calibration process may simultaneously minimize color coordinate and luminance deviations in LCD modules.

According to another embodiment of the present disclosure, an advanced white balance calibration process may achieve homogeneity among a plurality of LCD modules.

The technical effects of the present disclosure are not limited to the technical effects described above, and other technical effects not mentioned herein may be understood to those skilled in the art to which the present disclosure belongs from the description below.

DETAILED DESCRIPTION

Figure 1:
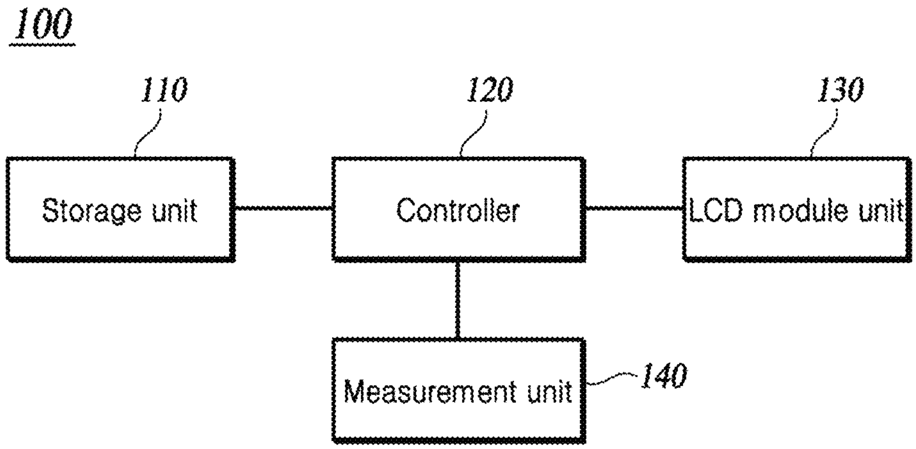
FIG. 1 is a simple illustration of a block diagram showing an image display apparatus 100 according to one embodiment of the present disclosure.

Hereinafter, some embodiments of the present disclosure are described in detail with reference to the accompanying drawings. In the following description, like reference numerals designate like elements, although the elements are shown in different drawings. Further, in the following description of some embodiments, a detailed description of known functions and configurations incorporated therein has been omitted for the purpose of clarity and for brevity.

Additionally, various terms, such as first, second, A, B, (a), (b), etc., are used solely to differentiate one component from the other but are not intended to imply or suggest the substances, order, or sequence of the components. Throughout the present disclosure, when a part 'includes' or 'comprises' a component, the part is meant to further include other components and not to exclude other components unless specifically stated to the contrary. The terms, such as 'unit', 'module', and the like, refer to one or more units for processing at least one function or operation, which may be implemented by hardware, software, or a combination thereof. When a controller, module, component, device, element, part, unit, or the like of the present disclosure is described as having a purpose or performing an operation, function, or the like, the controller, module, component, device, element, part, unit, or the like should be considered herein as being "configured to" meet that purpose or to perform that operation or function. Each controller, module, component, device, element, part, unit, and the like may separately embody or be included with a processor and a memory, such as a non-transitory computer readable media, as part of the apparatus.

The following detailed description, together with the accompanying drawings, is intended to illustrate embodiments of the present disclosure and is not intended to represent the only embodiments in which the disclosure may be practiced.

FIG. 1 is a simple illustration of a block diagram showing an image display apparatus 100 according to one embodiment of the present disclosure.

As shown in FIG. 1, an image display apparatus 100 according to one embodiment of the present disclosure may include all or part of a storage unit 110, a controller 120, an LCD module unit 130, and a measurement unit 140, either entirely or partially. Not all blocks shown in FIG. 1 are essential constituting elements; in other embodiments, some blocks included in the image display apparatus 100 may be added, modified, or removed. Meanwhile, the constituting elements shown in FIG. 1 represent functionally distinct functional elements, and at least one constituting element may be implemented in an integrated form in the physical environment.

The storage unit 110 may store data required for the white balance calibration and brightness calibration processes. The storage unit 110 may store a 'luminance database according to LED current' and a 'color coordinate variation database according to LED current.'

The luminance database according to LED current refers to a database that stores the luminance levels generated by the LCD module according to LED current settings. The image display apparatus 100 may use the luminance database according to LED current to determine the optimal luminance during the brightness calibration process.

The color coordinate variation database according to LED current refers to a database that stores changes in color coordinates according to LED current settings. The image display apparatus 100 may use the color coordinate variation database according to LED current to determine the optimal color coordinates during the white balance calibration process.

The controller 120 may include an application processor (AP), a graphics processing unit (GPU), and the like.

The controller 120 may perform white balance calibration and brightness calibration. The controller 120 may calculate the estimated luminance based on the extracted R/G/B gain values. The controller 120 may calculate the estimated BLU LED current based on the estimated luminance. The controller 120 may predict the amount of color coordinate variation caused by changes in the LED current. The controller 120 may perform calibration by compensating for the predicted color coordinate variation using the color coordinate values $W_x$ and $W_y$. The controller 120 may perform white balance calibration and brightness calibration simultaneously.

The controller 120 may transmit corrected display data and corrected dimming data to the LCD module unit 130. The corrected display data refers to display setting values adjusted during the white balance calibration process. The corrected dimming data refers to luminance values adjusted during the brightness calibration process.

The LCD module unit 130 may include a liquid crystal cell, a backlight unit (BLU), a driver circuit, and the like. The LCD module unit 130 may receive corrected display data and corrected dimming data from the controller 120. Based on the corrected display data, the LCD module unit 130 may output corrected color coordinates. Based on the corrected dimming data, the LCD module unit 130 may output corrected brightness.

The measurement unit 140 may measure the color coordinates and luminance of the LCD module unit 130. The measurement unit 140 may input the measured color coordinates and luminance to the controller 120. The measured color coordinates and luminance refer to the actual values obtained by measuring actual color coordinates and luminance of the display. The measured color coordinates and luminance may serve as reference points during the calibration process. The controller 120 may perform the calibration process using the measured color coordinates and luminance.

Figure 2:
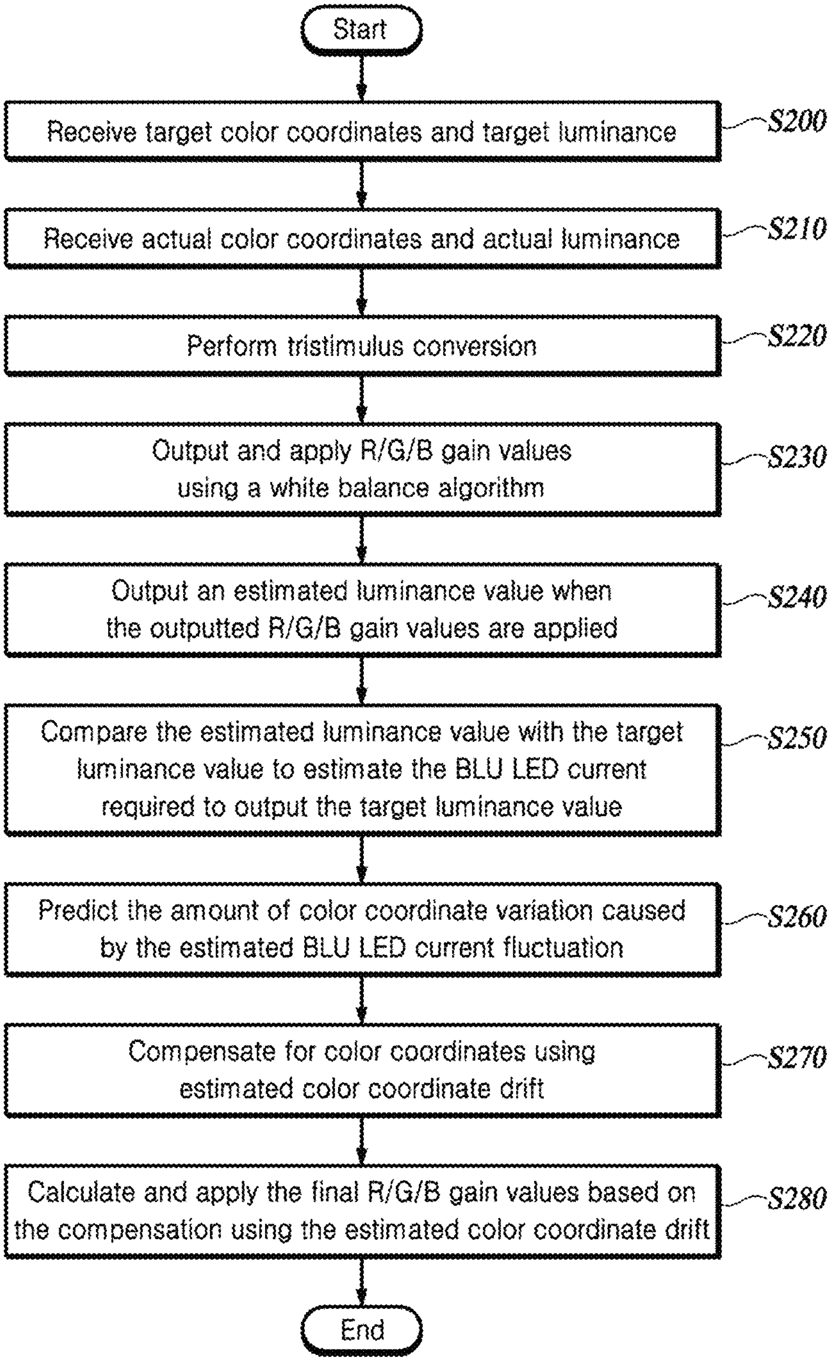
FIG. 2 is a flow diagram illustrating an advanced white balance calibration process according to one embodiment of the present disclosure.

FIG. 2 is a flow diagram illustrating an advanced white balance calibration process according to one embodiment of the present disclosure.

Referring to FIG. 2, the advanced white balance calibration according to one embodiment of the present disclosure may perform white balance calibration and brightness calibration simultaneously. The image display apparatus 100 may shorten the overall calibration process by utilizing the advanced white balance calibration. The image display apparatus 100 may minimize both color coordinate and luminance deviations in the LCD module and achieve homogeneity across a plurality of LCD modules using the advanced white balance calibration.

The image display apparatus 100 may receive target color coordinates $W_x$, $W_y$ and target luminance S200. Target color coordinates refer to the desired color coordinates of a specific color set during the calibration process. The color coordinates may represent the precise color position that the display aims to reproduce on the CIE 1931 xy chromaticity diagram. The image display apparatus 100 may adjust the actual display color coordinates to match the target color coordinates through calibration. Target luminance refers to the desired brightness level set during the calibration process. The image display apparatus 100 may adjust the actual luminance to match the target luminance value through calibration.

The image display apparatus 100 may receive actual color coordinates and actual luminance S210. The actual color coordinates and actual luminance may be measured from the LCD module unit 130.

The image display apparatus 100 may convert the target color coordinates and target luminance into tristimulus values S220. The image display apparatus 100 may convert actual color coordinates and actual luminance into tristimulus values.

The CIE 1931 xy chromaticity diagram is a two-dimensional color space that represents the chromaticity of colors using x and y coordinates. Since the CIE 1931 xy chromaticity diagram does not directly consider the Z value, luminance information of colors may be missing. If a white balance algorithm is implemented solely based on the CIE 1931 xy chromaticity diagram, color adjustments are made using only the color coordinates, which may lead to significant variations in the x and y values. In particular, since the gains of the Red and Green channels, which contribute the most to white luminance, may be adjusted significantly, the overall luminance may be reduced.

The human eye contains cells that detect three primary light sources at short, medium, and long wavelengths, enabling a wide range of color perception. The CIE 1931 xy chromaticity diagram represents the function of detecting the three light sources using only x and y coordinates and excludes the z value, which may result in the omission of luminance information.

Tristimulus conversion refers to the process of converting tristimulus values into X, Y, Z coordinates using x and y coordinates of the CIE 1931 xy chromaticity diagram and the Y luminance value. Since the CIE 1931 xy chromaticity diagram is a two-dimensional color space that lacks the z component, it is necessary to convert tristimulus values into X, Y, and Z components to perform white balance calibration. When white balance calibration is conducted using tristimulus conversion, luminance contribution of each color channel may be calculated and adjusted more accurately, resulting in reduced luminance loss.

The image display apparatus 100 may output R/G/B gain values individually using a white balance algorithm S230. The image display apparatus 100 may apply the output R/G/B gain values to the LCD module unit 130.

When the image display apparatus 100 applies the output R/G/B gain values to the display, the estimated luminance value of the display may be calculated S240. Here, the estimated luminance value of the display is referred to as the estimated luminance value. The image display apparatus 100 may calculate the estimated luminance value using an estimated luminance calculation formula.

Displays are generally designed to satisfy a gamma value of 2.2±0.2. Gamma refers to a numerical value that determines the correlation between the brightness of the signal input to the display and the luminance of the image displayed on the screen. Depending on the gamma value, the same screen may exhibit different brightness tones. The image display apparatus 100 may inversely calculate the luminance at each R/G/B gain value derived from the white balance algorithm based on the gamma value and the R/G/B gains (gray levels).

The image display apparatus 100 may compare the estimated luminance value with the target luminance value to estimate the BLU LED current required to output the target luminance value S250. The image display apparatus 100 may use the luminance database according to LED current stored in the storage unit 110 to estimate the BLU LED current required to output the target luminance value. The image display apparatus 100 may calculate the optimal LED current for outputting the target luminance value using a brightness calibration algorithm. The image display apparatus 100 may apply the calculated optimal LED current to the LCD module unit 130.

The image display apparatus 100 may predict the amount of color coordinate variation caused by the estimated BLU LED current fluctuation S260. In the present disclosure, the color coordinate variation due to the estimated BLU LED current fluctuation is referred to as the estimated color coordinate drift. The image display apparatus 100 may calculate the estimated color coordinate drift value based on the color coordinate variation database according to LED current stored in the storage unit 110.

The image display apparatus 100 may compensate for the target color coordinates using the estimated color coordinate drift S270. The image display apparatus 100 may compensate for the $W_x$, $W_y$ color coordinate values using the estimated color coordinate drift. The image display apparatus 100 may simultaneously perform white balance calibration and brightness calibration. During the brightness calibration process, the image display apparatus 100 may control the BLU LED current.

The image display apparatus 100 may calculate the final R/G/B gain values based on the compensation using the estimated color coordinate drift S280. The image display apparatus 100 may apply the final R/G/B gain values to the LCD module unit 130.

Figure 3:
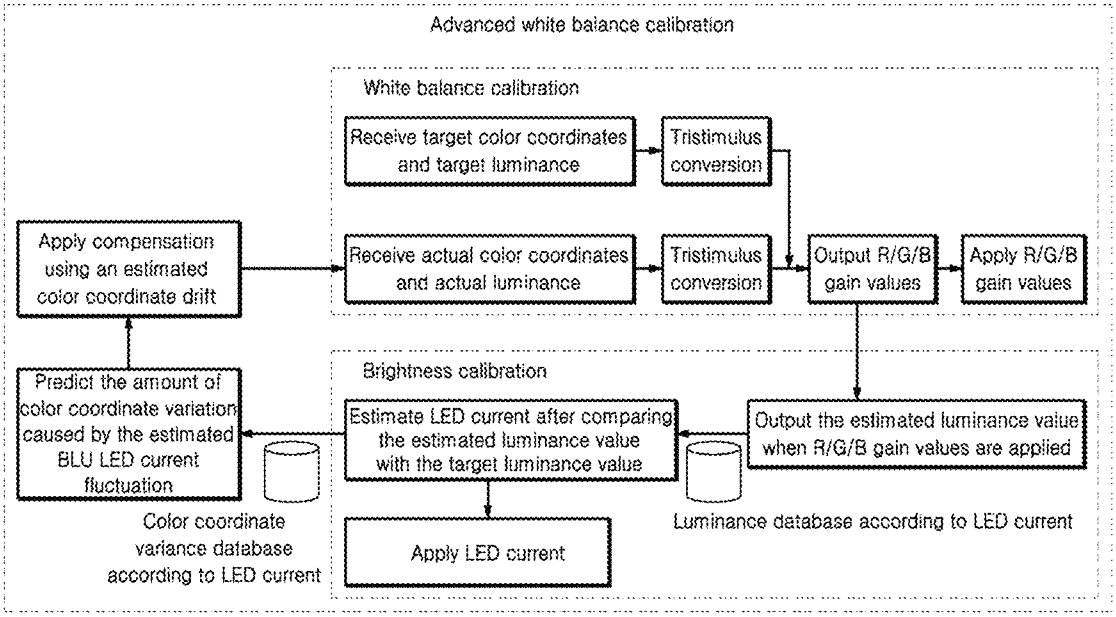
FIG. 3 illustrates an advanced white balance calibration process according to one embodiment of the present disclosure.

FIG. 3 illustrates an advanced white balance calibration process according to one embodiment of the present disclosure.

Referring to FIG. 3, the advanced white balance calibration includes the conventional white balance calibration. The advanced white balance calibration may perform the white balance calibration.

For example, the advanced white balance calibration may receive target color coordinates $W_x$, $W_y$ and target luminance. The advanced white balance calibration may receive actual color coordinates and actual luminance. The advanced white balance calibration may convert the target color coordinates and target luminance into tristimulus values. The advanced white balance calibration may convert actual color coordinates and actual luminance into tristimulus values. The advanced white balance calibration may use a white balance algorithm to individually output R/G/B gain values. The advanced white balance calibration may apply the output R/G/B gain values to the LCD module unit 130.

The advanced white balance calibration may perform the brightness calibration process and the white balance calibration process simultaneously. For example, the advanced white balance calibration may calculate the estimated luminance value of the display when the output R/G/B gain values are applied. The advanced white balance calibration may compare the estimated luminance value with the target luminance value to estimate the BLU LED current required to output the target luminance value. The advanced white balance calibration may use the luminance database according to LED current stored in the storage unit 110 to estimate the BLU LED current required to output the target luminance value.

The advanced white balance calibration may calculate the optimal LED current required to output the target luminance value using a brightness calibration algorithm. The advanced white balance calibration may apply the calculated optimal LED current to the LCD module unit 130.

The advanced white balance calibration may predict the amount of color coordinate variation caused by the estimated BLU LED current fluctuation. The advanced white balance calibration may compensate for the $W_x$, $W_y$ color coordinate values using the estimated color coordinate drift. The advanced white balance calibration may compensate for the $W_x$, $W_y$ color coordinate values using the estimated color coordinate drift. The advanced white balance calibration may simultaneously perform white balance calibration and brightness calibration. During the brightness calibration process, the advanced white balance calibration may control the BLU LED current.

The advanced white balance calibration may compensate for the target color coordinates using the estimated color coordinate drift. The advanced white balance calibration may calculate the final R/G/B gain values based on the compensation using the estimated color coordinate drift. The advanced white balance calibration may apply the final R/G/B gain values to the LCD module unit 130.

Figure 4:
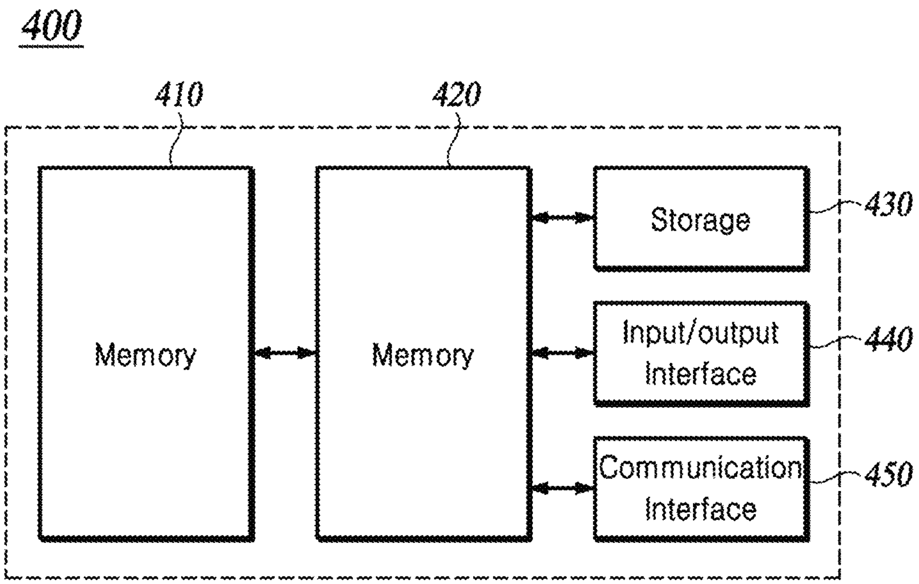
FIG. 4 is a simple illustration of a block diagram showing an exemplary computing device that may be used to implement a method and an apparatus according to the present disclosure.

FIG. 4 is a simple illustration of a block diagram showing an exemplary computing device that may be used to implement a method and an apparatus according to the present disclosure.

The computing device 400 may include all of part of a memory 410, a processor 420, storage 430, an input/output interface 440, and a communication interface 450. The computing device 400 may structurally and/or functionally include at least a portion of the image display apparatus 100. The computing device 400 may be a stationary computing device, such as a desktop computer or a server, as well as a mobile computing device, such as a laptop computer, a smartphone, or an automotive electronic device. The computing device 400 may be implemented as an arbitrarily specialized hardware accelerator capable of efficiently processing operations devised for an artificial intelligence model. For example, the computing device 500 may include a graphics processing unit (GPU), a Tensor Processing Unit (TPU), or a neural processing unit (NPU).

The memory 410 may store a program that enables the processor 420 to perform methods or operations according to various embodiments of the present disclosure. For example, a program may include a plurality of instructions executable by the processor 420, and the methods or operations described above may be performed by executing the plurality of instructions by the processor 420. The memory 410 may consist of a single memory or a plurality of memories. In this case, information required to perform the methods or operation according to various embodiments of the present disclosure may be stored in a single memory or distributed across a plurality of memories. When the memory 400 is composed of a plurality of memories, the plurality of memories may be physically separated. The memory 410 may include at least one of volatile memory and non-volatile memory. Volatile memory includes Static Random Access Memory (SRAM) or Dynamic Random Access Memory (DRAM), while non-volatile memory includes flash memory.

The processor 420 may include at least one core capable of executing at least one instruction. The processor 420 may execute instructions stored in the memory 410. The processor 420 may consist of a single processor or a plurality of processors.

The storage 430 maintains stored data even if power supplied to the computing device 400 is cut off. For example, the storage 430 may include non-volatile memory or may include a storage medium such as a magnetic tape, an optical disk, or a magnetic disk. A program stored in the storage 430 may be loaded into the memory 410 before being executed by the processor 420. The storage 430 may store files written in a program language, and a program created from the files by a compiler may be loaded into the memory 410. The storage 430 may store data to be processed by the processor 420 and/or data processed by the processor 420.

The input/output interface 440 may provide an interface with an input device such as a keyboard or a mouse and/or an output device such as a display device or a printer. The user may trigger execution of a program by the processor 420 through the input device and/or check the processing results of the processor 420 through the output device.

The communication interface 450 may provide access to an external network. The computing device 400 may communicate with other devices through the communication interface 450.

Each element of the apparatus or method can be implemented in hardware, software, or a combination of hardware and software. The functions of the respective elements may be implemented in software, and a microprocessor can be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various implementations can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

A computer-readable recording medium includes any type of recording device that stores data that can be read by a computer system. Such a computer-readable recording medium may be a non-volatile or non-transitory medium, such as a ROM, CD-ROM, magnetic tape, floppy disk, memory card, hard disk, optical magnetic disk, or storage device, and may further include a transitory medium, such as a data transmission medium. The computer-readable recording medium may also be distributed across a networked computer system, such that the computer-readable code is stored and executed in a distributed manner.

Although operations are illustrated in the flowcharts/timing charts in the present disclosure as being sequentially performed, this is merely a description of the technical idea of embodiments of the present disclosure. In other words, those having ordinary skill in the art to which the present disclosure pertains may appreciate that various modifications and changes can be made without departing from essential features of embodiments of the present disclosure. In other words, the sequence illustrated in the flowcharts/timing charts can be changed and one or more operations of the operations can be performed in parallel. Thus, flowcharts/timing charts are not limited to the temporal order.

Although embodiments of the present disclosure have been described for illustrative purposes, those having ordinary skill in the art should appreciate that various modifications, additions, and substitutions are possible, without departing from the idea and scope of the claimed present disclosure. Therefore, the embodiments of the present disclosure have been described for the sake of brevity and clarity. The scope of the technical idea of the present disclosure is not limited by the illustrations. Accordingly, one having ordinary skill in the art should understand that the scope of the claimed present disclosure is not to be limited by the above explicitly described embodiments but by the claims and equivalents thereof.

What is claimed is:

1. An image display method using advanced white balance calibration, the method comprising:

receiving target color coordinates and target luminance;

receiving actual color coordinates and actual luminance measured from an LCD module;

performing tristimulus conversion using one or more of the target color coordinates, the target luminance, the actual color coordinates, and the actual luminance;

outputting R/G/B gain values using a white balance algorithm;

calculating an estimated luminance value of the LCD module when the outputted R/G/B gain values are applied to the LCD module;

comparing the estimated luminance value with the target luminance value to estimate a BLU LED current required to output the target luminance value;

predicting an amount of color coordinate variation caused by the estimated BLU LED current fluctuation;

compensating for the target color coordinates using the predicted color coordinate variation; and calculating final R/G/B gain values and applying the final R/G/B gain values to the LCD module.

2. The method of claim 1, wherein performing the tristimulus conversion comprises:

converting tristimulus values into X, Y, Z coordinates using x and y coordinates of the CIE 1931 xy chromaticity diagram and a luminance value.

3. The method of claim 1, wherein predicting the BLU LED current comprises:

predicting BLU LED current capable of outputting the target luminance using a luminance database according to LED current.

4. The method of claim 1, wherein predicting the amount of color coordinate variation caused by the estimated BLU LED current fluctuation comprises:

predicting the amount of color coordinate variation based on a color coordinate variation database according to LED current.

5. An image display apparatus using advanced white balance calibration, the apparatus comprising:

at least one memory configured to store commands; and at least one processor, wherein the at least one processor is configured to:

receive target color coordinates and target luminance;

receive actual color coordinates and actual luminance measured from an LCD module;

perform tristimulus conversion using one or more of the target color coordinates, the target luminance, the actual color coordinates, and the actual luminance;

output R/G/B gain values using a white balance algorithm;

calculate an estimated luminance value of the LCD module when the outputted R/G/B gain values are applied to the LCD module;

compare the estimated luminance value with the target luminance value to estimate a BLU LED current required to output the target luminance value;

predict an amount of color coordinate variation caused by the estimated BLU LED current fluctuation;

compensate for the target color coordinates using the predicted color coordinate variation; and calculate final R/G/B gain values and applying the final R/G/B gain values to the LCD module.

6. The apparatus of claim 5, wherein the at least one processor is further configured to:

convert tristimulus values into X, Y, Z coordinates using x and y coordinates of the CIE 1931 xy chromaticity diagram and a luminance value.

7. The apparatus of claim 5, wherein the at least one processor is further configured to:

predict BLU LED current capable of outputting the target luminance using a luminance database according to LED current.

8. The apparatus of claim 5, wherein the at least one processor is further configured to:

predict the amount of color coordinate variation based on a color coordinate variation database according to LED current.

* * * * *